(12) United States Patent
Vogelsang et al.

(10) Patent No.: US 6,928,810 B2
(45) Date of Patent: Aug. 16, 2005

(54) HYDRODYNAMIC COMPONENT

(75) Inventors: Klaus Vogelsang, Crailsheim (DE); Reinhard Kernchen, Satteldorf (DE); Werner Klement, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 10/362,897

(22) PCT Filed: Aug. 29, 2001

(86) PCT No.: PCT/EP01/09935

§ 371 (c)(1),
(2), (4) Date: Apr. 24, 2003

(87) PCT Pub. No.: WO02/18812

PCT Pub. Date: Mar. 7, 2002

(65) Prior Publication Data

US 2003/0159438 A1 Aug. 28, 2003

(30) Foreign Application Priority Data

Aug. 30, 2000 (DE) ......................................... 100 42 865
Sep. 20, 2000 (DE) ......................................... 100 46 830

(51) Int. Cl.[7] .............................................. F16D 33/16
(52) U.S. Cl. .......................................... 60/347; 60/357
(58) Field of Search ........................ 60/357, 347, 351, 60/358, 359

(56) References Cited

U.S. PATENT DOCUMENTS

| 1,914,289 | A | | 6/1933 | Pomeroy et al. | |
|---|---|---|---|---|---|
| 2,179,518 | A | | 11/1939 | Popper | 60/54 |
| 3,635,026 | A | * | 1/1972 | Hahn et al. | 60/358 |
| 3,989,127 | A | * | 11/1976 | Staudenmaier et al. | 60/347 |
| 4,073,139 | A | * | 2/1978 | Armasow et al. | 60/357 |
| 4,201,050 | A | * | 5/1980 | Nixel | 60/357 |
| 4,203,289 | A | * | 5/1980 | Muschelknautz | 60/358 |
| 4,423,803 | A | | 1/1984 | Malloy | 192/3.29 |
| 4,444,009 | A | * | 4/1984 | Merkle | 60/358 |
| 4,516,399 | A | | 5/1985 | Holler et al. | 60/351 |
| 4,597,481 | A | * | 7/1986 | Muller et al. | 60/347 |
| 4,669,262 | A | | 6/1987 | Muller | 60/347 |

FOREIGN PATENT DOCUMENTS

| DE | 612 031 | 4/1935 |
|---|---|---|
| DE | 755 935 | 2/1953 |
| DE | 1 140 595 | 6/1963 |
| DE | 1 750 198 | 2/1971 |
| DE | 32 40 179 | 6/1983 |
| DE | 32 11 337 | 10/1983 |
| DE | 32 40 334 | 1/1985 |
| DE | 34 35 659 | 10/1985 |
| DE | 34 34 860 | 4/1986 |
| DE | 37 21 402 | 1/1989 |
| DE | 43 42 103 | 6/1995 |
| FR | 2 276 516 | 1/1976 |

* cited by examiner

*Primary Examiner*—Thomas E. Lazo
(74) *Attorney, Agent, or Firm*—Baker & Daniels

(57) ABSTRACT

A hydrodynamic component (1) comprising: two rotating blade wheels: a primary blade wheel (3) and a secondary blade wheel (4), which together form at least one torus-shaped working chamber (5Z); at least inlet (10) for service fluid leading into the torus-shaped working chamber, the inlet being located in the vicinity of the lowest static pressure; at least one outlet (24) leading out of the torus-shaped working chamber; a working fluid circulation (22) which is set up in the torus-shaped working chamber during operation; a closed circuit (21) allocated to the working chamber and an external section (23) of the closed circuit, said section being located between the outlet and the inlet.

3 Claims, 2 Drawing Sheets

HYDRODYNAMIC COMPONENT

BACKGROUND OF THE INVENTION

The invention relates to a hydrodynamic component, designed as a hydrodynamic clutch or conversion device.

Hydrodynamic components with at least two rotating blade wheels are designed as hydrodynamic clutches or hydrodynamic speed/torque conversion devices and are used as a rule in drive trains. The power transfer occurs by means of hydrodynamic forces. The hydrodynamic components can be engaged and disengaged, whereby this quality of engaging and disengaging can be achieved by means of filling and evacuating. The filling of hydrodynamic clutches occurs in the vicinity of the inside diameter of the torus-shaped working chamber in the gap between pump impeller and turbine wheel and in designs as Föttinger couplings with variable-pitch guide vanes by means of a collecting pan on the pump impeller or in the pump impeller pan. To fill the working chamber very quickly and achieve high power consumption values, however, it is necessary to place the service fluid under pressure in the working chamber and hold it in the working chamber, which requires additional precautions.

Further, possibilities for filling the working chamber with low resistance are known, in which the inlet into the torus-shaped working chamber occurs in the core. As representatives of these possibilities, reference is made to the following named publications:

DE-OS 755 935
DE-OS 1 750 198
DE32 11 337 A1

In spite of the possibility of rapidly putting them into operation and transferring high capacities, a significant drawback of these designs is that when supplying the service fluid, for example, oxygen is added, which has negative effects on the mode of operation, and in addition the relative work volume is, as a result, low.

SUMMARY OF THE INVENTION

The invention is therefore based on the object of further developing a hydrodynamic component of the initially named type that, when put into operation, can consume and transfer high capacities relatively quickly. This also requires that the hydrodynamic component can be operated as quickly as possible with a relatively high work volume.

The solution in accordance with the invention is a hydrodynamic component having two rotating blade wheels that together form a torus-shaped working chamber, an inlet in the torus-shaved working chamber located in the vicinity of the lowest static pressure and at least one outlet from the working chamber. A working fluid circulation is set up in the working chamber during operation of the hydrodynamic component having one closed circuit allocated to the working chamber and having one external section of the closed circuit located between the outlet and the inlet.

The inlet is arranged in the working chamber in the vicinity of the lowest static pressure. This and this area is also termed core chamber, which with regard to its location is describable by means of an arrangement in the vicinity of the mean diameter $d_m$ of the torus-shaped working chamber and in the vicinity of the junction plane between the primary blade wheel and the secondary blade wheel, or in other words by means of a diameter of the surface bisectrix.

In addition, a closed circuit is allocated to the hydrodynamic component. This is coupled with the outlet from the torus-shaped working chamber and the inlet to the torus-shaped working chamber. During operation a so-called working fluid circulation sets up in the torus-shaped working chamber. The part of the closed circuit arranged between the outlet and inlet is also termed the external section. This solution offers the advantage that the service fluid is supplied to the torus-shaped working chamber without additional gases, for example, oxygen, since said the service fluid is always conducted in the closed circuit. In addition, the relative working volume, which is provided for the hydrodynamic component, in particular the torus-shaped working chamber, is higher than in comparison to solutions with open circuit, which is why high capacities can be consumed and transferred here very quickly.

The solution according to the invention has the advantage that the service fluid can be fed into the torus-shaped working chamber without pressure and during the operation of the hydrodynamic component, in particular during the rotation of one of the blade wheels, remains in the working chamber. Thus, in use in hydrodynamic clutches, compared to conventional solutions without the requirement of providing an excess pressure, high $\lambda A$ values can be attained at a speed ratio $\upsilon=0$.

$$\lambda = f(\upsilon)$$

$\upsilon = n_t/n_p$ in accordance with VDI guideline 2153 [Association of German Engineers guideline 2153]

The inlet to the core chamber takes place at a blade of the blading of one of the rotating blade wheels—primary blade wheel or secondary blade wheel. The inlet is preferably arranged in the vicinity of the blade end. However, an arrangement between the base of the blade and the blade end would also be conceivable. For this purpose the inlet is connected with a service fuel supply and/or filling chamber by means of at least one duct. This duct can a) be incorporated into the blade, i.e. extension by means of the blade or b) be arranged at a side of the blade.

In the latter case mentioned it is possible to develop the blade with this duct as a component or arrange a separate element at the side of the blade.

The service fuel supply and/or filling area is arranged at the external periphery of a blade wheel in radial direction underneath the mean diameter $d_m$. The duct extends from the service fuel supply and/or filling chamber through the wall of one of the blade wheels to or through a blade of the blading in the direction of the mean diameter $d_m$ in the vicinity of the junction plane to the blade end.

Preferably a number of inlet areas are provided, to which a corresponding number of ducts are allocated, whereby the individual ducts are connected with each other by means of a ring duct. This ring duct is formed preferably by the supply and/or filling chamber.

The duct or ducts are, viewed in axial section through the torus-shaped working chamber, arranged at an angle between 20° and 70° opposite the junction.

The solution in accordance with the invention of filling the core ring is suitable for hydrodynamic components in the form of hydrodynamic clutches, comprising a primary blade wheel functioning as a pump impeller and a secondary blade wheel functioning as a turbine wheel, and hydrodynamic speed/torque converters, comprising a primary blade wheel, a secondary blade wheel and at least one guide wheel. The use can occur in vehicles as well as stationary systems.

BRIEF DESCRIPTION OF THE DRAWINGS

The solution in accordance with the invention is described in the following by means of figures. In particular, the following is described.

DETAILED DESCRIPTION

Figure 1:
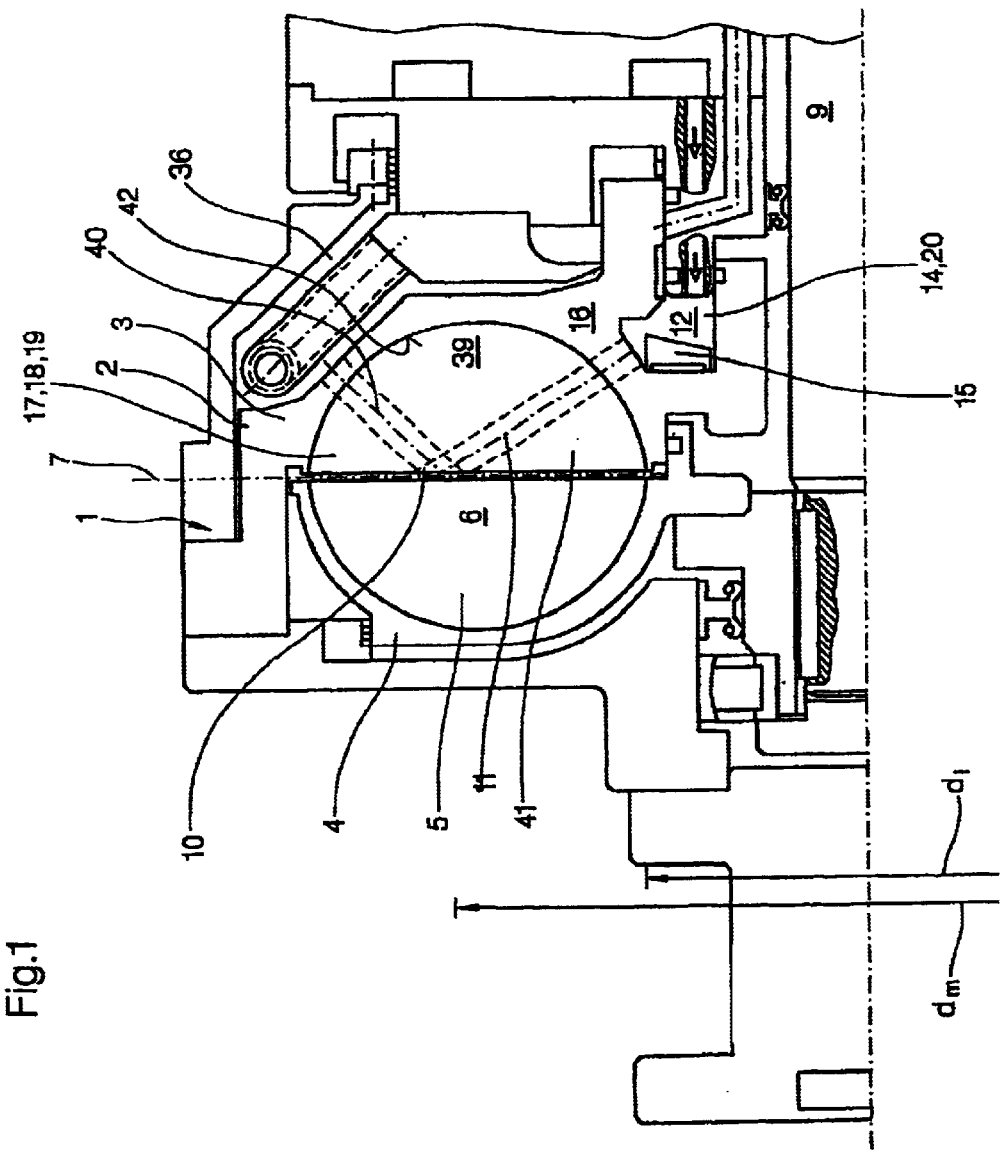
FIG. 1 illustrates the basic principle of core ring filling using a design of a hydrodynamic clutch

FIG. 1 illustrates in schematically simplified display using a hydrodynamic component 1 in the form of a hydrodynamic clutch 2, comprising two rotating blade wheels—a primary blade wheel 3 and a secondary blade wheel 4, which together form at least one torus-shaped working chamber 5, the principle in accordance with the invention of filling the core chamber 6 of the torus-shaped working chamber 5. By core chamber 6, an area is understood which is arranged in cross-section through the hydrodynamic clutch 2 in the torus-shaped working chamber 5 in its center or in other words with regard to its location is describable in the vicinity of a junction plane 7 between the primary blade wheel 3 and the secondary blade wheel 4 in the vicinity of the mean diameter $d_m$ of the torus-shaped working chamber. The primary blade wheel 3 of the hydrodynamic clutch is coupled with a drive 8 not shown here in detail, while the secondary blade wheel 4 is locked with a secondary drive 9. Upon use in drive systems of vehicles the secondary drive 9 is formed, for example, by gear stages in series relative to the hydrodynamic clutch 2. The primary blade wheel 3 functions as a pump impeller in the power transfer from drive 8 to secondary drive 9, the secondary blade wheel 4 functions as a turbine wheel.

The torus-shaped working chamber has at least one inlet 10 allocated to it. In accordance with the invention the inlet 10 is arranged in the working chamber 5 in the vicinity of the lowest static pressure, that is core chamber 6. The inlet 10 is for this purpose coupled by means of at least one duct 11 with a filling chamber 12, which is allocated to the hydrodynamic clutch 2, preferably, however, viewed in radial direction in the vicinity within the mean diameter $d_m$ of the torus-shaped working chamber. Preferably the filling chamber 12 is arranged in the vicinity of the inner diameter $d_i$ of the torus-shaped working chamber and coupled with a corresponding service fuel supply system 13. The filling chamber 12 is designed in the represented case as collecting pan 14, which has blades aligned in the direction of the flow. The filling chamber 12 is located outside of the torus-shaped working chamber 6 and is connected with the inlet 10 by means of duct 11. The duct 11 extends through the wall 16 of one of the blade wheels and through a blade 17 of the blading 18 of one of the two blade wheels—primary blade wheel 3 or secondary blade wheel 4. In the displayed case the filling of the core chamber 6 occur preferably by means of the primary blade wheel coupled with the drive 8, that is pump impeller 3. The duct 11 for the conduction of the service fuel from filling chamber 12 thus extends through the wall 16 of the primary blade wheel 3 and a blade of the blading of primary blade wheel 3. In the process the formation of duct 11 in core chamber 6 takes place as a function of the arrangement of the filling chamber 12 opposite the torus-shaped working chamber 5. The displayed case illustrates an advantageous development, in which the filling chamber 12 is arranged beneath the mean diameter of the torus-shaped working chamber in radial direction, preferably in the vicinity of the inside diameter $d_i$ of the torus-shaped working chamber 5. The arrangement of the filling chamber 12 occurs in axial direction in the vicinity between the junction plane 7 and the outer dimensions in axial direction of the corresponding blade wheel, here the primary blade wheel 3. In the represented case this results essentially in a duct guide running at an angle between 20 and 70 for the duct 11. The guiding of the duct 11 through a blade 17 of the blading 18 takes place preferably in the vicinity of the rear of the blade 19. It is possible to incorporate the duct 11 into a standard blade 17 of the blading 18 or to design the blade which carries the duct 11 in accordance with this function, so that the blade differs from the other blades of the blading 19 with regard to design. However, this is essentially dependent on the available thickness of the individual blades of the blading 18 and in addition on the required cross-section of flow to be provided for achieving a filling in an appropriate time period.

Under an especially advantageous aspect of the invention not only one inlet 10 is to be provided in the core chamber 6, but rather a number of annular inlets, which are, however, not represented here in detail. The individual inlets are each connected with the filling chamber 12 by means of corresponding ducts 11. The individual ducts are coupled to each other by means of a ring duct 20, which can be formed by the filling chamber 12. The service fluid, in particular oil, or in the case of water clutches, water can be admitted without pressure, or also with pressure.

Figure 2:
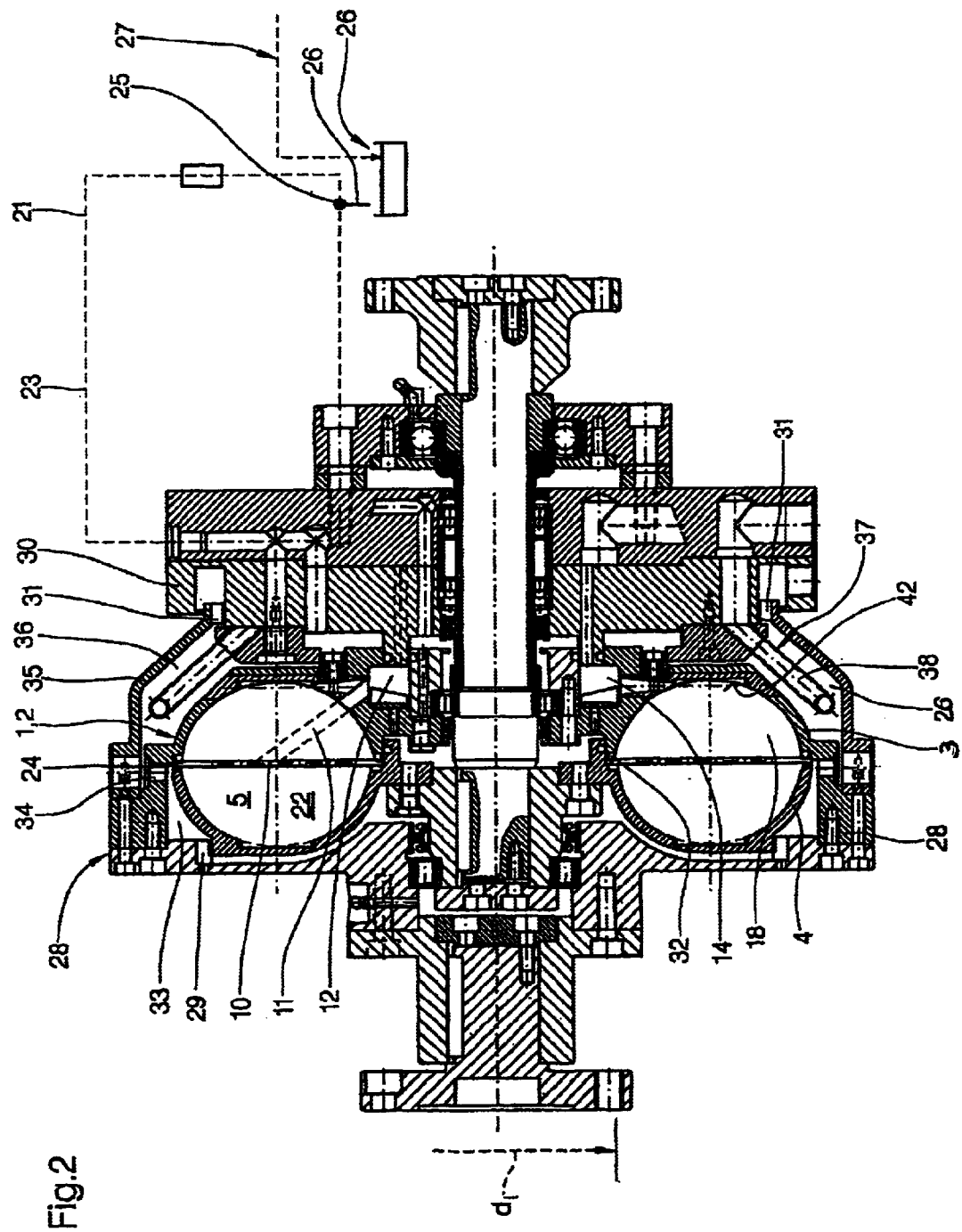
FIG. 2 illustrates an especially advantageous application of the solution according to the invention

In an especially advantageous development the solution according to the invention of filling the core chamber 6 is applied in a hydrodynamic clutch 2 with a closed circuit 21. This closed circuit 21 comprises the working fluid circulation 22 setting up in the torus-shaped working chamber 5 and an external part 23 outside of the working chamber 5, which is only connected with the inlet 10 in the torus-shaped working chamber 5 and at least one outlet 24, after discharge from the torus-shaped working chamber 5. The closed circuit 21 is designed to be pressure sealed, and as illustrated in FIG. 2, is alternatively coupleable by means of a junction 25 with resources 26 for filling and/or evacuation and resources 27 for generating an influencing pressure factor for the pressure in the closed circuit 21. The hydrodynamic clutch 2 comprises for this purpose a casing 28 allocated to the primary blade wheel 3, which is locked with the primary blade wheel 3 and sealed from the secondary blade wheel 4 by means of a first device for sealing 29, and to a resting case 30 by means of a second device for sealing 31. To achieve a pressure sealed tight closed circuit 21 it is in addition necessary that the individual connection pipes and ducts between the outlet 24 from the torus-shaped working chamber 5 and the inlet 10 to the torus-shaped working chamber 5 also be designed pressure sealed. This occurs as a rule by means of providing third devices for sealing 32 between the primary wheel blade 3 and the secondary wheel blade 4 in the vicinity of the junction plane 7 in the vicinity of the inside diameter $d_i$ of the torus-shaped working chamber 5. These sealing devices are co-rotational gaskets which on the basis of the relative motion between the elements to be sealed from one another are designed as contact-free gaskets, preferably labyrinth seals. This applies for the first device for sealing 29, the second device for sealing 31 and the third device for sealing 32.

The outlet 24 flows to a first space 33 between the casing 28 and the turbine wheel. The casing 28 has for this purpose a baffle, which is locked with the primary wheel blade 3 and in addition is locked with casing 28. By means of leak holes 34 in the baffle it is possible to overflow service fluid into the pump impeller pan 35. This and the external periphery of the primary blade wheel 3 thereby limit a so-called dynamic air pressure pump chamber 36, in which resources 37 are arranged for evacuation of service fluid from the outlet chamber and for maintaining the circulation of service fluid in the closed circuit 21 in the form of dynamic pressure pumps 38. These are components of the external section 23 of the closed circuit 21.

The design shown in FIG. 2 of a hydrodynamic clutch shows an especially preferred application of filling in the core chamber 6. However, other designs are also conceivable. The solution according to the invention is in addition not restricted to the hydrodynamic component in the form of a hydrodynamic clutch, but rather can also be applied with hydrodynamic speed/torque converters.

Under an additional aspect of the invention, in advantageous manner for both designs in accordance with FIGS. 1 and 2 so-called ventilation blades 39 are provided in the blading 18 of one of the two blade wheels, here preferably the primary blade wheel. The ventilation takes place from the core chamber 6 in a chamber outside of the torus-shaped working chamber 5, according to example from FIGS. 1 and 2 to the dynamic air pressure pump chamber 36. However, other possibilities are also conceivable. The ventilation blades 39 are designed accordingly and preferably have so-called ventilation bores 40, which extend through the blade walls from the vicinity of the blade end 41 in the direction of the blade base 42 of the blading 18. The arrangement of the ventilation bore 40 can occur directly centrally through a single blade of the blading 18 or be arranged either in the vicinity of the front of the blade or the rear of the blade. This is in particular dependent on the concrete design of the blades of the blading 18, especially the blade thickness and the manufacturing process used.

The solution according to the invention can be employed for hydrodynamic components in the form of hydrodynamic clutches and hydrodynamic speed/torque converters for use both in mobile as well as stationary systems. There are no limitations with regard to the field of application.

Reference Symbol List 1 hydrodynamic component
2 hydrodynamic clutch
3 primary blade wheel
4 secondary blade wheel
5 torus-shaped working chamber
6 core chamber
7 junction plane
8 drive
9 secondary drive
10 inlet
11 duct
12 filling chamber
13 service fuel supply system
14 collecting pan
15 blade
16 wall
17 blade
18 blading
19 rear of blade
20 ring channel/duct
21 closed circuit
22 working fluid circulation
23 external section of the closed circuit
24 outlet
25 junction
26 resource for filling and/or evacuation
27 resource for generating an influence pressure on the pressure in the closed circuit 21
28 casing
29 first device for sealing
30 resting case
31 second device for sealing
32 third device for sealing
33 first space
34 leak holes
35 pump impeller pan
36 dynamic air pressure pump chamber
37 resources 37 are arranged for evacuation of service fluid from the outlet chamber and for maintaining the circulation of service fluid in the closed circuit
38 dynamic pressure pump
39 ventilation blade
40 ventilation bores
41 end of blade
42 base of blade
$d_m$ mean diameter of the torus-shaped working chamber
$d_i$ inside diameter of the torus-shaped working chamber

What is claimed is:

1. A hydrodynamic component, comprising:
   two rotating blade wheels—one primary blade wheel and one secondary blade wheel which together form at least one torus-shaped working chamber;
   said chamber having at least one inlet for service fluid in the torus-shaped working chamber, said inlet in the working chamber being located in the core chamber of the working chamber at a blade of the blading of one of said rotating blade wheels, the vicinity of the lowest static pressure;
   at least one outlet from the torus-shaped working chamber;
   a working fluid circulation set up in the torus-shaped working chamber during operation;
   a closed circuit allocated to the working chamber, said closed circuit having an external section which is arranged between the outlet and the inlet;
   a service fluid supply and/or filling chamber connected with the inlet by means of a duct;
   the service fluid supply and/or filling chamber being located at the external periphery of a blade wheel in radial direction within the mean diameter $d_m$;
   said duct extending from the service fluid supply and/or filling chamber through the wall of one of the blade wheels to or through a blade of the blading in the direction of the mean diameter $d_m$ in the vicinity of the junction plane to the blade end.

2. A hydrodynamic component, comprising:
   two rotating blade wheels—one primary blade wheel and one secondary blade wheel which together form at least one torus-shaped working chamber;
   said chamber having at least one inlet for service fluid in the torus-shaped working chamber, said inlet in the working chamber being located in the core chamber of the working chamber at a blade of the blading of one of said rotating blade wheels, the vicinity of the lowest static pressure;
   at least one outlet from the torus-shaped working chamber;
   a working fluid circulation set up in the torus-shaped working chamber during operation;
   a closed circuit allocated to the working chamber, said closed circuit having an external section which is arranged between the outlet and the inlet;
   a service fluid supply and/or filling chamber connected with the inlet by means of a duct;
   a plurality of inlet areas to which a number of such ducts are allocated, whereby the individual ducts are connected with each of other by means of a ring duct.

3. The hydrodynamic component of claim 2 wherein said ring duct is formed by the supply and/or filling chamber.

* * * * *